United States Patent [19]

Willis et al.

[11] 3,991,781
[45] Nov. 16, 1976

[54] APPARATUS FOR AND METHOD OF AUTOMATICALLY CLEANING AN OBSTRUCTED VALVE

[76] Inventors: Roderick M. Willis, 2624 W. Crockett St., Seattle, Wash. 98199; Charles L. Oldfather, 8812 40th SW., Seattle, Wash. 98116

[22] Filed: Nov. 17, 1975

[21] Appl. No.: 632,278

Related U.S. Application Data

[62] Division of Ser. No. 536,974, Dec. 23, 1974.

[52] U.S. Cl. ............................... 137/15; 137/238; 137/487.5; 137/624.11
[51] Int. Cl.² ................................... F16K 51/00
[58] Field of Search ............... 137/15, 237–241, 137/487, 487.5

[56] References Cited
UNITED STATES PATENTS

| | | | |
|---|---|---|---|
| 3,385,522 | 5/1968 | Kock | 137/238 X |
| 3,433,245 | 3/1969 | Cymbalisty | 137/242 |

*Primary Examiner*—Martin P. Schwadron
*Assistant Examiner*—Richard Gerard
*Attorney, Agent, or Firm*—Seed, Berry, Vernon & Baynham

[57] ABSTRACT

Waste water containing particulate matter is saturated with air or other gas by a dynamic mixer and ejected into a gravity filter system at a point above the filter media but below the water surface level. Upon entering the filter tank, the dissolved gas is released, forming small bubbles on filterable particles to float these particles to the surface for removal. The system further includes a back pressure valve at the sewage inlet port which, if obstructed, is automatically flushed. During the backwash cycle, the water level above the filter bed may be lowered to the level of a wash-through zone, and filtered water then pumped upward through the filter media, thereby carrying particles from the filter media out through the wash-through zone.

8 Claims, 2 Drawing Figures

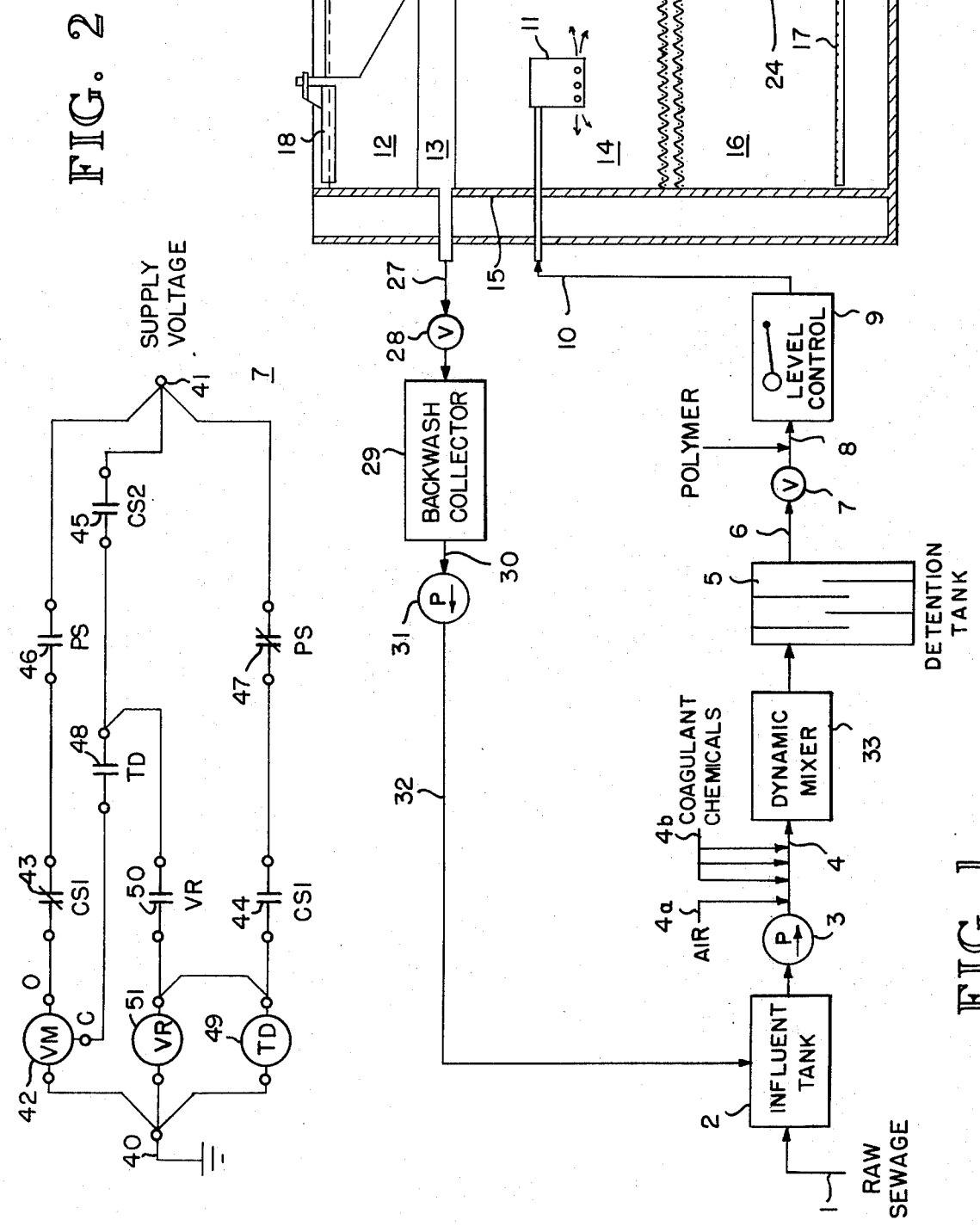

APPARATUS FOR AND METHOD OF AUTOMATICALLY CLEANING AN OBSTRUCTED VALVE

This is a division of application Ser. No. 536,974, filed Dec. 23, 1974.

BACKGROUND OF THE INVENTION

1. Field of the Invention

This invention relates liquid filters and, more particularly, to waste water filters which are periodically cleansed by forcing water through the filter in a reverse direction.

2. Description of the Prior Art

In the treatment of water supplies for potable, industrial and other uses, the water is commonly preconditioned by the addition of chemicals and then passed through settling basins or other means of pre-separation before filtering, or, in other designs, chemical treatment alone may be employed to precondition the water prior to passing it through filters for removal of the undesirable constituents.

Filters commonly used may employ only a simple media, with the bed being composed of multiple layers of media of different sized gradations, or they may be composed of several materials of varying sized gradations, placement and specific gravity. Regardless of composition, the filter bed is periodically cleansed of entrapped material by means of reversing the normal filter flow. This cleansing procedure is commonly known as the "backwash cycle." Backwashing is usually performed by forcing the backwash water in the opposite direction of the normal filter flow at rates which are sufficient to expand the filter media and wash the entrapped material out of the bed by means of a collection system, such as launderers or wash troughs. One of the problems with the prior art devices is the difficulty in reducing the suspended matter sufficiently to obtain adequate efficiency in the filter operation. More specifically, the amount of suspended matter quickly reduces the length of filter cycle so that much of effluent is again returned to the system as backwash waste.

Recent art has shown the effectiveness of the flotation process in separating the suspended matter, much of which tends to float rather than to settle. Prior art generally used various clarification steps involving settlement of the suspended matter, but such clarification was both costly and only partly effective.

Using flotation ahead of the filtration step has until recent art required a separate unit. In any case, successful flotation requires the release of dissolved gases.

In order to release the dissolved gases from the sewage in the optimum manner, it is necessary to pass a portion or all of the flow under pressure through a back pressure or throttling valve located at the inlet to the flotation section. It has often been very difficult to do this because of the wide variety of foreign matter frequently found in sewage which has a tendency to obstruct the free flow of water through the valves.

SUMMARY OF THE INVENTION

According to the present invention, sewage or waste water having particulates suspended therein is withdrawn from an influent tank, pressurized with a positive displacement grinder pump, and injected with a gas and coagulant chemicals. This mixture is then agitated by a dynamic mixer prior to entry into a small detention tank. The detention tank serves as a positive chemical mixing chamber as well as a detention tank to insure complete dissolution of gas into the liquid. An automatically controlled, back pressure valve releases the sewage at a controlled rate into the filter container at a point above the level of the filter media and below the surface of the water. The back pressure valve is adapted to automatically respond in the event that foreign matter in the sewage obstructs the flow through the valve. When the sewage enters the filter container, the gas dissolved therein is released, carrying most of the solid particles contained in the sewage to the water's surface where they are directed into a sludge collector by a sludge scraper. The remaining solid particles move with the flow of water into the filter media where they are trapped, and the filtered water flows out the bottom to a detention tank wherein the water may be chemically treated. Solid particles trapped in the filter media must be periodically removed in order to obtain optimum performance from the treatment plant. This cleansing, commonly called "backwashing," is performed by forcing treated water up through the filter media in the opposite direction from the normal filtering flow and at a faster rate. The rapid reverse flow causes the filter bed to expand thereby releasing trapped particles into the backwater flow. Prior to the start of the backwash cycle, the water level within the filter container may be lowered to a wash-through zone. The wash-through zone is an area below the normal surface of the water wherein water can freely flow out of the filter container during the backwash cycle and into a backwash collector. Thus, during the backwash cycle, the particles trapped within the filter bed, along with the backwash water, flow into the wash-through zone, then to the backwash collector and, finally, to the influent tank. At the end of the backwash cycle, the reverse flow of water is terminated, the water level within the filter container rises to the level of the sludge scraper, and raw sewage, saturated with gas and/or chemicals, once again enters the filter container. In other modifications of this invention, the backwash waste and sludge are not separated, in which case the level is not lowered and the backwash water exits the filter through the sludge collector.

BRIEF DESCRIPTION OF THE DRAWINGS

FIG. 1 is a schematic flow diagram of the sewage treatment plant according to the present invention.

FIG. 2 is an electrical schematic of the self-cleansing back pressure valve according to the present invention.

DETAILED DESCRIPTION OF THE DRAWINGS

Raw sewage or waste water containing particulate matter (hereafter referred to as "raw sewage") flows into the influent tank 2 at raw sewage inlet and is temporarily stored. The size of influent tank 2 is principaly a function of the maximum peak sewage flow at any given time. Thus, as long as the average intake of raw sewage does not exceed the capacity of the treatment plant, any amount of peak raw sewage flow may be accommodated for a short period of time. During periods of slight raw sewage flow, it may be desirable to deactivate the treatment plant and allow raw sewage to accumulate in the influent tank 2. A level detection device (not shown), such as a floating mercury-type switch, can then be used to reactivate the treatment plant when the level of the raw sewage in the influent tank 2 reaches a predetermined value. Influent tank 2 also serves as a storage tank for the accumulation of backwash water after it has been forced through the filter bed 16 in a reverse direction during the backwash cycle.

Grinder pump 3 pressurized the raw sewage, thereby forcing it into pipe 4, and also grinds up any foreign matter found in the raw sewage to a reduced size. Pipe 4 contains a plurality of inlet ports 4a and 4b. A gas, such as air, is forced into solution with the sewage contained in pipe 4 at inlet port 4a, typically at a pressure of 42 p.s.i. A variety of chemicals may be added at port 4b. Chemical coaglation by the addition of certain inorganic chemicals in combination with recently developed polyelectrolytes creates a floc in the influent. Coagulating chemicals may be alum, ferric chloride or cationic polyelectrolytes, often in combination. The pH is initially reduced by feeding sulfuric acid. Anionic or non-ionic polyelectrolytes for filter conditioning may also be advisable.

The raw sewage, as well as the gas and chemicals contained therein, is then agitated by a dynamic mixer 33, which may consist of rotating paddle wheels, prior to being carried to a small detention tank 5. The dynamic mixer causes a greater degree of saturation of air within the sewage, and also aids in mixing the chemicals. The detention tank further serves as a positive chemical mixing chamber as well as a detention tank to insure complete dissolution of the gas into the liquid. Sewage then flows from detention tank 5 through pipe 6 at a pressure controlled by self-cleansing back pressure valve 7. As will be explained later, back pressure valve 7 is adapted to automatically free itself of any foreign matter obstructing flow through the valve. Sewage then flows from back pressure valve 7 to inlet pot 11 through pipes 8 and 10 and level control 9. Level control 9 functions to maintain the level of water in the filter container 15 at a predetermined value.

The partially treated sewage is injected into the inlet pot 11 tangentially in order to provide a swirling motion for better distribution. Inlet pot 11 contains a plurality of slots through which influent flows into the filter container 15. At atmospheric pressure, the gas dissolved in the pressurized sewage "effervesces" from the sewage in the form of miniscule bubbles which float to the surface through wash-through zone 13 and flotation zone 12, carrying with them small particles of solid matter contained in the sewage. These solid particles are present as suspended solids or chemical coagulants "flocs." Flotation effect on these particles is almost instantaneous, and a heavy sludge is formed on the surface of flotation zone 12. The sludge at the top of the flotation zone 12 is directed into a sludge collector 19 by the rotating sludge scraper 18. The sludge may pass into an aerobic digestion tank (not shown) from which the supernatant may be recycled to the influent tank 2. An alternate procedure is to collect the sludge in a traveling paper belt conveyor which passes directly to an exterior incinerator (not shown). Another successful alternate procedure is the use of a biologic aerobic digestion process, such as a high rate "trickling filter," operating in conjunction with the influent tank 2 described above. In this case, the sludge may be recycled to the influent tank for digestion.

The clarified effluent, which now contains only 20% to 35% of the raw influent solids, passes through the clarified zone 14 and is drawn through filter bed 16. The treated effluent is removed at filter underdrain 17 and, since valve 21 is open during the filtering cycle, is pumped into detention tank 24 by effluent pump 23. Valve 20 is normally closed at this time. Detention tank 24 serves a dual purpose. Filtered water may be held there for the addition of chlorine at chlorine inlet 25 prior to being discharged through treated effluent discharge port 26. Additionally, the water held in detention tank 26 is used as the backwash water during the backwash cycle.

The backwash cycle can be initiated in response to either an increase in the resistance to flow through filter bed 16 reaching a predetermined value as a result of an excess of solid particles contained therein or the turbidity of the treated effluent reaching a predetermined value. When the backwash cycle begins, backwash controls (not shown) will shut down grinder pump 3 and lower the level of sewage in filter container 15 to wash-through zone 13 by opening backwash valve 28 and allowing sewage to flow through pipe 27 into backwash collector 29. Backwash pump 22 and backwash waste pump 31 are also activated at this time. Since valve 21 is now closed and valve 20 is now open, treated effluent is pumped from detention tank 24 by backwash pump 22 out through filter underdrain 17 and up through filter bed 16. Reverse flow through filter bed 16 causes filter bed expansion and agitation and is fully developed once the flow velocity of the backwash water has been established. This expansion and agitation quickly separates the filtered particles from filter bed 16 and carries them, along with the backwash water, through wash-through zone 13 and into backwash collector 29 through pipe 27 and open backwash valve 28. Backwash flow from backwash collector 29 is generally recycled to influent tank 2 by backwash waste pump 31 through pipe 32. However, where the solids in the backwash stream settle rapidly, it may be desirble to place a small settling tank (not shown) between backwash waste pump 31 and influent tank 2 to collect some of the solid particles. Generally, the entire backwash cycle requires less than 6 minutes.

Alternatively, where separation of the backwash water from the sludge is not required, the backwash water can exit the filter container 15 through the sludge collector 19. This alternative backwash cycle is identical to the backwash cycle with respect to the inflow of backwash water. However, the level of sewage in the filter container 15 is not lowered to the wash-through zone 13 and backwash valve 28 remains closed. Instead, backwash water exits the filter container through the sludge collector 19 and is directed to the sludge disposal.

At the conclusion of the backwash cycle, valve 20 is closed, valve 21 is opened, backwash pump 22 and backwash waste pump 31 are deactivated, grinder pump 3 and effluent pump 23 are reactivated, and the sewage level in filter container 15 is once again restored to the top surface of flotation zone 12.

As mentioned previously, back pressure valve 7 periodically will be obstructed by solid matter in the raw sewage. In prior art devices, it was necessary to manually open the valve to release the obstructing matter. The present invention automatically cleanses itself of obstructing matter by sensing the presence of an obstruction and opening the valve until the obstruction has been cleared. Referring to FIG. 2, back pressure valve 7 is driven by a valve motor 42. Normally open pressure switch 46 closes and normally closed pressure switch 47 opens when the pressure differential across valve 7 exceeds a predetermined value, thereby indicating that the valve 7 is obstructed. Normally closed contact switch 43 will open and normally open contact switch 44 will close when the valve motor 42 is in a closed position. Normally open contact switch 45 will be closed when valve 7 is not in a closed position. Time-delay contact 48 will normally be open, except that it will close a predetermined time after time-delay relay 49 is energized and remain closed as long as time-delay relay 49 is energized. Normally open valve relay contact 50 will close when valve relay 51 is activated and will remain closed until valve relay 51 is de-energized.

When an obstruction of valve 7 occurs, normally open pressure switch 46 closes, thereby connecting power to the open terminal of reversible valve motor 42 through closed contact 43. As valve 7 starts to open, valve actuated contact switch 45 closes, thereby energizing contacts for subsequent use. When valve 7 reaches its wide open position, valve actuated contact switch 43 opens to remove power from the open terminal of valve motor 42, and valve activated contact switch 44 closes to apply power to time-delay relay 49 when pressure switch 47 once again closes upon the resumption of flow. Thus, valve 7 remains in the wide open position until the pressure returns to normal and flow is once again resumed. At that point, pressure switch 47 will close, activating time-delay relay 49 to close time-delay contact 48 after a predetermined time delay. At the same time that time-delay relay 49 is activated, valve relay 51 is also activated to close valve relay contact 50 to maintain power to time-delay relay 49 until valve 7 has closed, thereby opening valve actuated contact switch 45. After the time delay period, valve motor 42 is activated to close through time-delay contact 48. When the valve 7 reaches its flow limiting point, contact switch 45 opens to remove the closing signal from the valve motor 42. Thus, it is seen that when a pressure drop occurs, valve 7 is opened and will remain open for as long as the obstruction remains. When valve 7 has been cleared, it will remain open for a predetermined time delay and will then be automatically returned to its former position.

It will be noted that many modifications of this invention may be implemented without departing from the spirit of this invention. For instance, normally closed pressure switch 47 may be eliminated, in which case, reliance is placed on the time-delay setting for adequate flushing of the valve. Instead of the time delay, a variable-speed valve motor may be used so that the length of time required to open and close the valve will be adequate for flushing. In this case, normally open time-delay contact 48 is replaced by a normally open valve activated switch identical to valve activated contact 45. The result is the same as before, except that there is no time delay after the valve relay is energized. In place of pressure switches 46 and 47, any flow failure sensor may be employed, such as a flow sensing switch, heat sensors, etc. In many applications, the change in pressure differential across the valve can be most simply detected by either a pressure increase ahead of the valve or a pressure decrease after the valve. Also, it has been found that the addition of a holding relay to lock in the opening of the valve, once initiated, may be advantageous to avoid interrupting the sequence by a premature clearance of the obstruction. Changes in the details of construction may be restored to without departing from the spirit of the invention, and it is accordingly my intention that no limitations be implied from the specific embodiment shown. In particular, the apparatus and method have a wide application beyond treating raw sewage. For example, our invention can be used to upgrade lagoon effluent, to treat secondary or primary sewage effluents, to treat certain industrial wastes or to remove organic matter from streams. More broadly, this invention can be used to remove particles from any particle-bearing liquid.

The embodiments of the invention in which a particular property or privilege is claimed are defined as follows:

1. A method of cleansing an obstructed valve comprising:
    sensing the presence and absence of an obstruction within said valve;
    opening said valve in response to said obstruction being sensed as present; and
    closing said valve to a predetermined position after a predetermined period of time has elapsed from when said obstruction has been sensed as absent.

2. A method of cleansing an obstructed valve as in claim 1 wherein said valve is closed by:
    activating a time-delay relay in response to said obstruction being sensed as absent; and
    closing said valve to a predetermined position at the expiration of said time delay.

3. A method of cleansing an obstructed valve as in claim 1 wherein the presence and absence of said obstruction is sensed by measuring the pressure at either side of said valve.

4. A method of cleansing an obstructed valve as in claim 1 wherein the presence and absence of said obstruction is sensed by measuring the flow rate through said valve.

5. A method of cleansing an obstructed valve comprising:
    sensing the pressure at either side of said valve;
    opening said valve when the pressure differential reaches a first predetermined value;
    activating a time-delay relay when the pressure differential reaches a second predetermined value; and
    closing said valve to a predetermined position at the expiration of said time delay.

6. An apparatus for cleansing an obstructed valve comprising:
    a valve actuator adapted to open and close said valve
    a sensor for determining the presence and absence of an obstruction within said valve and producing a signal indicative thereof;
    means for energizing said valve actuator to open said valve in response to said sensor indicating the presence of an obstruction within said valve;
    a time-delay relay adapted to energize said valve actuator to close said valve a predetermined time after said time-delay relay is energized; and
    means for energizing said time-delay relay in response to said sensor's indicating the absence of an obstruction within said valve.

7. An apparatus for cleansing an obstructed valve as in claim 6 wherein said sensor comprises a flow rate sensor for producing a signal indicative of the rate of flow through said valve.

8. An apparatus for cleansing an obstructed valve as in claim 6 wherein said sensor comprises a pressure switch adapted to sense the pressure at either side of said valve.

* * * * *